US011275148B2

(12) United States Patent
Sartain et al.

(10) Patent No.: US 11,275,148 B2
(45) Date of Patent: Mar. 15, 2022

(54) MULTI-SENSOR LOCATION DATA TRACKING

(71) Applicant: Advanced Micro Devices, Inc., Santa Clara, CA (US)

(72) Inventors: Daryl Galen Sartain, Austin, TX (US); Adam H. Li, La Jolla, CA (US); Bruce Montag, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 196 days.

(21) Appl. No.: 16/556,154

(22) Filed: Aug. 29, 2019

(65) Prior Publication Data

US 2021/0063524 A1 Mar. 4, 2021

(51) Int. Cl.
*G01S 5/02* (2010.01)
*G01S 5/16* (2006.01)
*G01S 5/08* (2006.01)

(52) U.S. Cl.
CPC .............. *G01S 5/0263* (2013.01); *G01S 5/08* (2013.01); *G01S 5/16* (2013.01)

(58) Field of Classification Search
CPC ............ G01S 5/0263; G01S 5/16; G01S 5/08; H04N 5/2253; H04N 5/2258; G01C 15/002; G01C 15/02; G01C 3/08; H04W 4/021; H04W 4/025; H04W 4/029

USPC .......................................................... 342/451
See application file for complete search history.

(56) References Cited

U.S. PATENT DOCUMENTS

2020/0110262 A1\* 4/2020 Bakos ...................... G06F 3/017
2020/0368616 A1\* 11/2020 Delamont ............... A63F 13/25

OTHER PUBLICATIONS

Silicon Labs, "Understanding Advanced Bluetooth Angle Estimation Techniques for Real-Time Locationing," downloaded from: https://www.silabs.com/documents/public/presentations/ew-2018-understanding-advanced-bluetooth-angle-estimation-techniques-for-real-time-locationing.pdf, 18 pgs., 2018.

\* cited by examiner

*Primary Examiner* — Shaima Q Aminzay
(74) *Attorney, Agent, or Firm* — Volpe Koenig (57) ABSTRACT

Disclosed herein are techniques for obtaining location data for a sensor fusion device. The techniques include transmitting or receiving a signal from or to the sensor fusion device. The techniques also include obtaining angle-based location data, based on the signal and on an angle-based location finding technique. The techniques also include determining location data for the sensor fusion device or an auxiliary device associated with the sensor fusion device, based on the angle-based location data.

20 Claims, 4 Drawing Sheets

MULTI-SENSOR LOCATION DATA TRACKING

BACKGROUND

Head-mounted devices that provide stereoscopic vision and audio output to a user, and that accept inputs from a user are increasingly popular. Advancements in related technologies are constantly being made.

SUMMARY

Disclosed herein are techniques for obtaining location data for a sensor fusion device. The techniques include transmitting or receiving a signal from or to the sensor fusion device. The techniques also include obtaining angle-based location data, based on the signal and on an angle-based location finding technique. The techniques also include determining location data for the sensor fusion device or an auxiliary device associated with the sensor fusion device, based on the angle-based location data.

BRIEF DESCRIPTION OF THE DRAWINGS

A more detailed understanding can be had from the following description, given by way of example in conjunction with the accompanying drawings wherein.

DETAILED DESCRIPTION

Disclosed herein are techniques for obtaining location data for a sensor fusion device. The techniques include transmitting or receiving a signal from or to the sensor fusion device. The techniques also include obtaining angle-based location data, based on the signal and on an angle-based location finding technique. The techniques also include determining location data for the sensor fusion device or an auxiliary device associated with the sensor fusion device, based on the angle-based location data.

Figure 1:
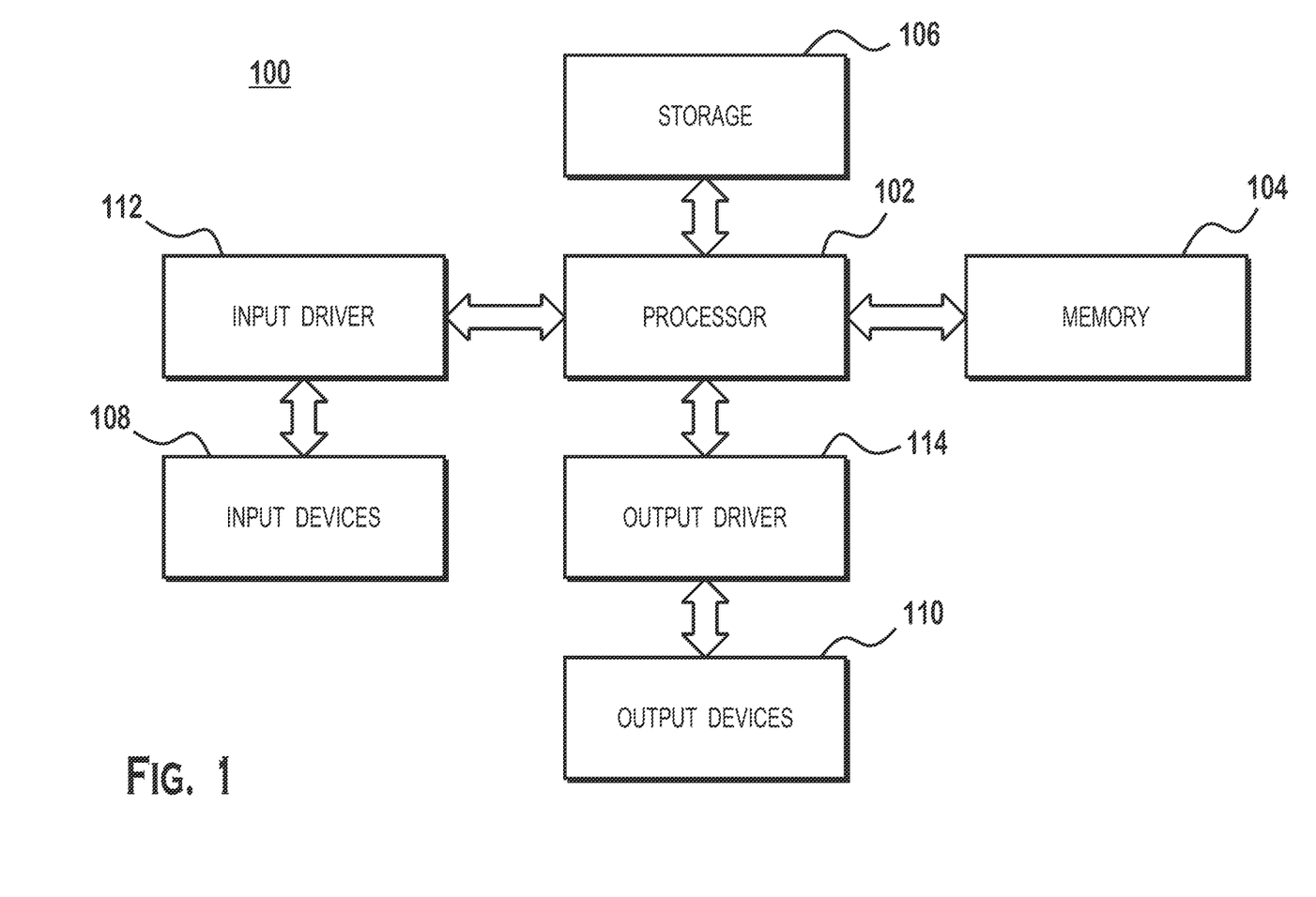
FIG. 1 is a block diagram of an example device in which one or more features of the disclosure can be implemented.

FIG. 1 is a block diagram of an example device 100 in which one or more features of the disclosure can be implemented. In various examples, the device 100 includes a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is be located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
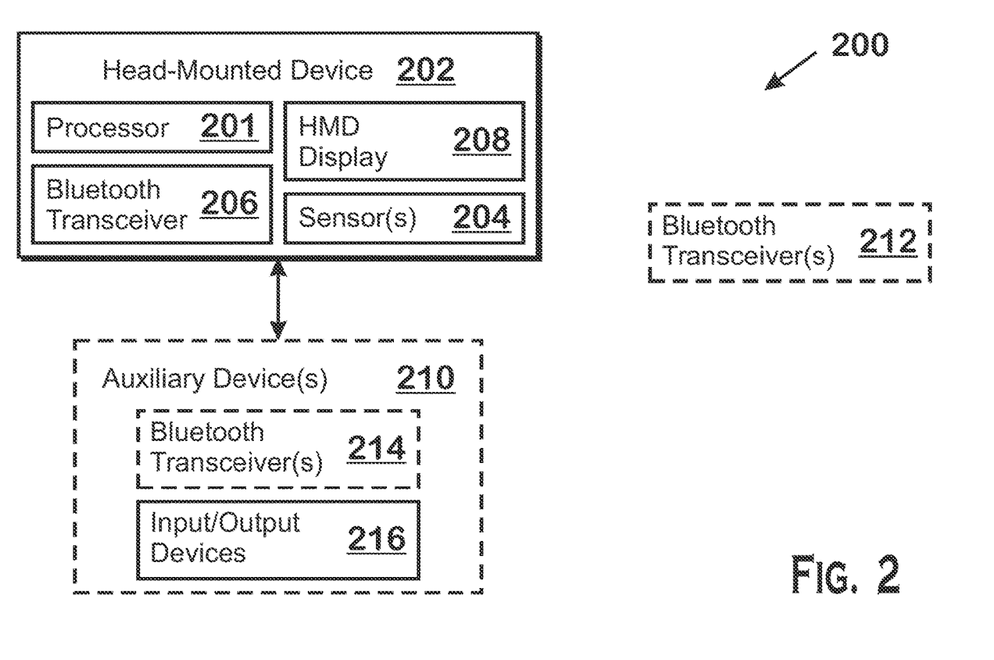
FIG. 2 illustrates an example head-mounted device ("HMD") system.

FIG. 2 illustrates an example head-mounted device ("HMD") system 200. The head-mounted device system 200 includes a head-mounted device 202. In some implementations, the head-mounted device system 200 includes one or more auxiliary devices 210, and in some implementations, the head-mounted device system 200 includes one or more external Bluetooth transceivers 212. Note, although the head-mounted device 202 and head-mounted device system are described with the term "head-mounted," it is possible to use the device 200 of FIG. s without the head-mounted device 202 being mounted on the head of a person. For example, it is possible to use the head-mounted device 200 on a robotic device, mounted on a vehicle, or mounted in any other setting. Thus the head-mounted device system 200 is sometimes referred to herein as a sensor fusion system 200 and the head-mounted device 202 is sometimes referred to herein as a sensor fusion device 202.

The head-mounted device 202 includes a processor 201, one or more sensors 204, a HMD display 208, and a Bluetooth transceiver 206. The sensors 204 include sensors for detecting one or more of position, velocity, acceleration, or the like. Examples of such sensors 204 include accelerometers for detecting acceleration and gyroscopes for detecting orientation and/or angular momentum. Although some example sensors are described, the sensors 204 alternatively or additionally includes sensor types that are not described herein.

The HMD display 208 includes a visual display for providing visual information to a user. In some implementations, the HMD display 208 includes two displays configured to display two slightly different images to provide a stereoscopic perspective to a user. The Bluetooth transceiver 206 transmits and receives Bluetooth signals to one or more of the external Bluetooth transceiver(s) 212 and/or the one or more Bluetooth transceivers of the one or more auxiliary devices 210. The Bluetooth transceivers 206, in conjunction with the Bluetooth transceiver(s) 212 and/or the one or more Bluetooth transceivers of the one or more auxiliary devices 210, are capable of identifying the angle of arrival and/or angle of departure of Bluetooth signals transmitted to or received from the external Bluetooth transceivers 212 or the Bluetooth transceivers 214 of the one or more auxiliary devices 210. Using such techniques, the Bluetooth transceiver 206 is capable of detecting the positions of the one or more Bluetooth transceivers 214 of the one or more auxiliary devices 210 and/or the one or more external Bluetooth transceivers 212. The angle of arrival and angle of departure capabilities were introduced into the Bluetooth standard with version 5.1. Briefly, in one example, the angle of arrival and angle of departure capabilities function as follows. At least one transceiver has multiple antennas. The antennas are spaced so that the phase difference between the signals received by each antenna is related to the angle of arrival of the signal. For angle of departure, the same technique is used in reverse. Specifically, the phase difference received between signals transmitted from different antennas is indicative of the angle with which the signal is transmitted. In some instances, the angle of attack and angle of departure is combined with signal strength to obtain a relative position of two transceivers. Techniques for determining position based on angle of attack and angle of departure based techniques are sometimes referred to collectively herein as "angle-based location finding."

In some examples, the one or more auxiliary devices 210 are physically configured to be mounted on or held by hands, arms, legs, feet, or other parts of a human body. Some example auxiliary devices 210 include hand-held controllers, or devices with straps or other mechanisms for attaching the auxiliary devices 210 to the body of a user. In some examples, the one or more auxiliary devices 210 include input/output devices 216. The input/output devices 216 include devices for accepting inputs from a user and/or include devices for providing output to a user. In various examples, devices for accepting inputs include buttons, touch sensors, auditory sensors, positioning sensors, cameras, or other sensors. In various examples, devices for providing output to a user include screens, lights, or other visual indicators, speakers or other audio indicators, haptic feedback devices, or other types of output devices.

In some examples, the one or more auxiliary devices 210 also include one or more Bluetooth transceivers 214. In some examples, the Bluetooth transceivers 214 communicate with the Bluetooth transceiver 206 of the head-mounted device 202 to allow the Bluetooth transceiver 206 of the head-mounted device 202 to determine one or more positions of the one or more auxiliary devices 210 with respect to the position of the head-mounted device 202.

The one or more external Bluetooth transceivers 212 are included in one or more external devices. Such external devices include stationary posts used for communication and/or positioning, an interactive device, such as a television, a gaming console, a desktop or laptop computer, or another device. In addition to receiving Bluetooth communications for positioning purposes, in some situations, the head-mounted device 202 also receives one or more of audio, video, or haptic data from an external device and, in some situations, provides input data to the one or more external device. In an example, the head-mounted device 202 and one or more auxiliary devices are part of a wearable unit that is communicatively coupled to an interactive device that includes at least one of the one or more external Bluetooth transceivers 202. The wearable unit allows interaction with software executed on the interactive device. In an example, the interactive device executes a video game, transmits audio and video data to the wearable unit via the Bluetooth transceiver 206, and receives user-supplied inputs from the wearable unit via the Bluetooth transceiver 206.

Each of the Bluetooth transceivers of the head-mounted device system 200, including the external Bluetooth transceiver(s) 212, the Bluetooth transceivers in the one or more auxiliary devices 210, and the Bluetooth transceiver of the head-mounted device 202 are, in some implementations, functionally coupled to one or more processors and other elements (such as memories) for controlling and communicating with the Bluetooth transceivers. In various examples, such processors and other elements are included in the corresponding devices such as the head-mounted device 202, the one or more auxiliary devices 210, and the device in which the one or more Bluetooth transceivers 212 are located.

As stated elsewhere herein, the various Bluetooth transceivers (Bluetooth transceiver 206, Bluetooth transceiver 214, and Bluetooth transceiver 212) are capable of determining position relative to another Bluetooth transceiver. Thus, in some implementations, the head-mounted device 202 uses the Bluetooth transceiver 206 to determine position of one or more auxiliary devices 210 and/or the external Bluetooth transceiver 212 relative to the head-mounted device 202. Disclosed herein are several techniques for utilizing the positional information provided by the Bluetooth transceivers in conjunction with other aspects of the system 200, to improve the functioning of the head-mounted device 202.

In various implementations, any of the head-mounted device 202, the interactive system in which the external Bluetooth transceivers 212 reside, and/or one or more of the one or more auxiliary devices 210 are implemented as the device 100 illustrated in FIG. 1. For the interactive system, in some implementations, the head-mounted device 202 is an input/output device (i.e., a combination of an input device 108 and an output device 110). In some examples, the head-mounted device 202 communicates directly with a cloud-based computing system (e.g., via a wireless computer network) to obtain graphics data for display on the HMD display 208, to provide input in the form of location data for the head-mounted device 202 and/or one or more auxiliary devices 210, as well as other input such as button presses, recorded audio, and the like. In some examples, the interactive system in which the external Bluetooth transceivers 212 reside communicates with a cloud-based computing system that executes interactive software remotely. In such examples, the interactive system receives inputs from the head-mount device 202 and relays those inputs to the cloud-based computing system. In such examples, the cloud-based computing system processes the inputs and transmits graphical and audio data to the interactive system, which relays that data to the head-mounted device 202.

Figure 3A:
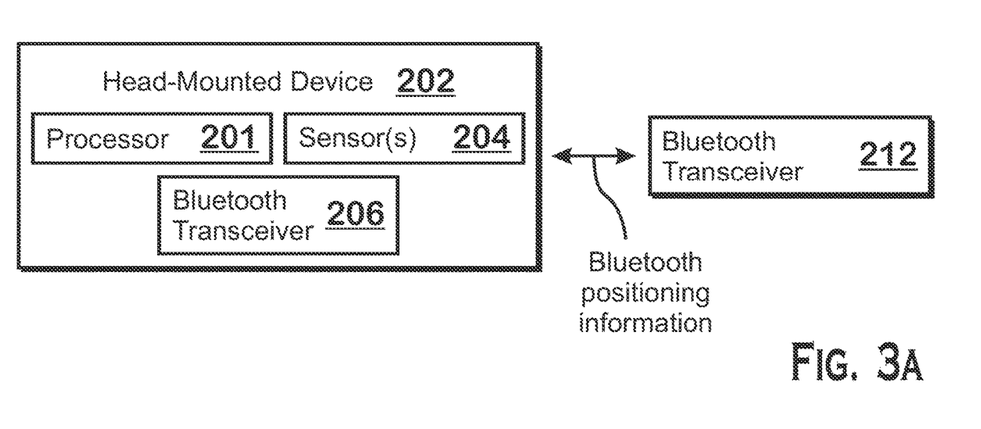
FIG. 3A illustrates a first example system in which a head-mounted device utilizes a Bluetooth transceiver in conjunction with one or more sensors to track position of the head-mounted device in relation to the Bluetooth external transceiver.

FIG. 3A illustrates a first example system in which a head-mounted device utilizes a Bluetooth transceiver 206 in conjunction with one or more sensors 204 to track position of the head-mounted device 202 in relation to the Bluetooth external transceiver 212. The one or more sensors 204 include sensors for tracking one or more of acceleration, orientation, and angular momentum.

In one example, utilizing the Bluetooth transceiver 206 in conjunction with the one or more sensors 204 to track position of the head-mounted device 202 occurs in the following manner. In this example, the sensors 204 include an accelerometer and a gyroscope, though other examples use different sensor types. The processor 201 utilizes these one or more sensors 204 to determine the position and orientation of the head-mounted device 202. Specifically, the processor 201 integrates acceleration measurements of the accelerometer to obtain velocity and integrates velocity to obtain changes in position. The processor 201 utilizes this technique in each time frame to determine the position of the head-mounted device 202 relative to a previous position. In an example, the processor 201 determines velocity as described above and modifies a stored current position based on the distance traveled in the unit time corresponding to the time frame, according to the determined velocity.

In this example, the processor 201 also determines angular position by integrating angular momentum. Specifically, in each time frame, the processor 201 updates a stored value representing the orientation (angular position or direction in which the head-mounted device 202 is facing) based on an angular momentum value measured by the gyroscope.

The above technique for determining position and orientation is subject to error, and especially to error accumulation over time ("drift"). Thus the processor 201 supplements the position and orientation determined based on the sensors 204 with the information obtained using the Bluetooth transceiver 206. Specifically, because receiving and processing signals via Bluetooth is associated with a higher amount of latency than receiving and processing signals from the sensors 204, the processor 201 frequently updates position and orientation relying on the sensors 204 described above, and less frequently utilizes the signals obtained via the Bluetooth transceiver 206 to adjust the position and orientation. As described above, the Bluetooth transceiver 206 is able to determine position of the head-mounted device 202 relative to the one or more external Bluetooth transceivers 212. The Bluetooth transceiver 206 is also capable of determining orientation of the head-mounted device 202 relative to the external Bluetooth transceiver 212 using the angle of arrival and angle of departure features. In an example, the processor 201 updates position and orientation once every "sensor frame," where a frame is a period of time in which the processor 201 can read and process one measurement from the sensors 204. Then, once every "correction time period," which is longer than one frame, the processor 201 updates the stored position and orientation based on the signals received with the Bluetooth transceiver 206. Thus, at a first frequency, the processor 201 updates position and orientation, and at a second frequency that is slower than the first frequency, the processor 201 updates the stored position and orientation based on the signals received with the Bluetooth transceiver 206. Although described as updating position and orientation, in various alternatives, the updates described are to one of position and orientation, and not the other.

Figure 3B:
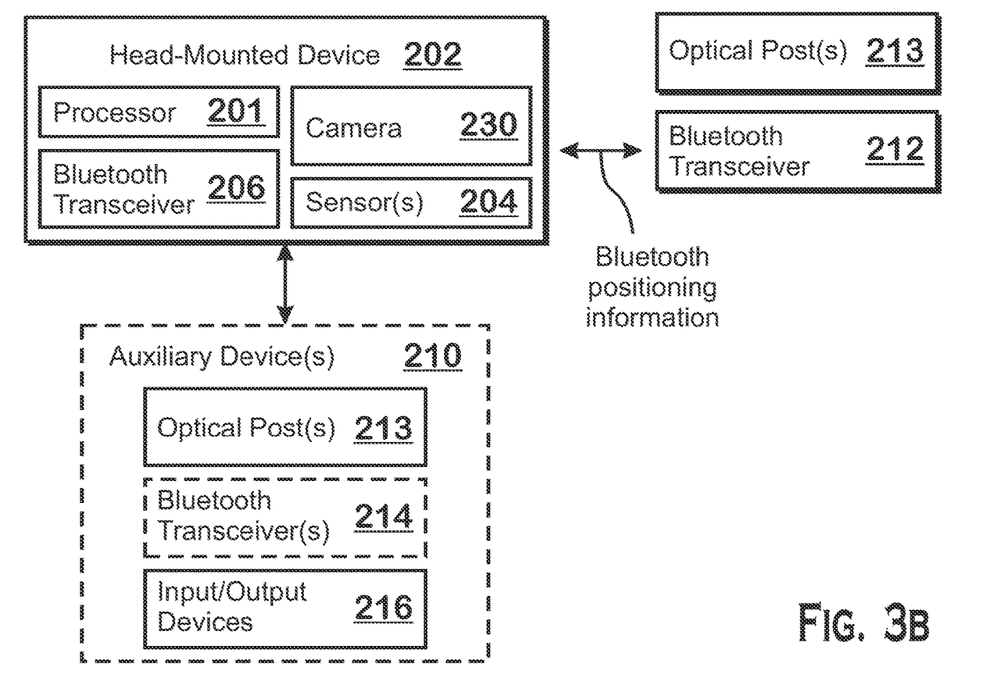
FIG. 3B illustrates a second example system that utilizes the Bluetooth transceiver of a head-mounted device to obtain position and orientation information for the head-mounted device.

FIG. 3B illustrates a second example system that utilizes the Bluetooth transceiver 206 of a head-mounted device 202 to obtain position and orientation information for the head-mounted device. In this example, the head-mounted device 202 includes one or more sensors 204, a Bluetooth transceiver 206 with the capability to detect the angle of incoming and outgoing signals from an external Bluetooth transceiver 212 and to determine position of the head-mounted device 202 relative to the external Bluetooth transceiver 212, one or more cameras 230, and a processor 201. One or more optical posts 213 also exist in the vicinity of the head-mounted device 202. The optical posts 213 emit optical signals for detection by the camera 230 of the head-mounted device 202. Note, in some implementations, the optical posts 213 "passively" emit optical signals in the sense that the posts 213 have one or more visual features that are recognizable by the processor 201, and need not actively emit light. The camera 230 records images of the environment.

In operation, the processor 201 receives the images from the camera 230 and identifies the position of the head-mounted device 202 relative to the one or more optical posts 213 through image processing. In an example, when the optical posts 213 are in view of the camera, the head-mounted device 202 analyzes any or all of the position of the optical posts 213 within the frame, the size of the optical posts 213 within the frame, the relative positions and/or orientations of the optical posts 213 to each other, or uses any other visual aspect of the optical posts 213 to determine position and orientation information of the head-mounted device 202.

In some implementations, optical posts 213 exist on one or more auxiliary devices 210. In such implementations, the camera 230 records images of such optical posts 213. The processor 201 determines the positions of the one or more auxiliary devices 210 relative to the position of the head-mounted device 202 utilizing techniques similar to those described above regarding utilizing the environmental optical posts 213 to determine position of the head-mounted device 202 in the environment.

In some implementations, the processor 201 utilizes the position and orientation information gathered from the Bluetooth transceiver 206 as described elsewhere herein to supplement the position information derived from the images captured by the camera 230. In one example, the processor 201 mathematically or logically combines the position and orientation information obtained using the camera 230 with the position and orientation information obtained using the Bluetooth transceiver 206. In an example, mathematically combining the position and orientation information includes obtaining an average of the values obtained via the two different techniques, performing a mathematical smoothing operation, discarding anomalous results, or performing any other technique for combining such information.

In some situations, the processor 201 utilizes the camera 230 as a primary means to determine position and/or orientation information of the head-mounted device 202 relative to the environment and relative to one or more auxiliary devices 210. In such situations, one or more of the optical posts 213 of the environment and/or on the one or more auxiliary devices 210 fall out of the viewing area of the camera 230 or become obscured by another object. In such situations, if the processor 201 is unable to obtain position or orientation information of the head-mounted device 202 due to the optical post 213 falling out of the viewing area or becoming obscured, the processor 201 utilizes the Bluetooth transceiver 206 to determine position and/or orientation information.

Figure 3C:
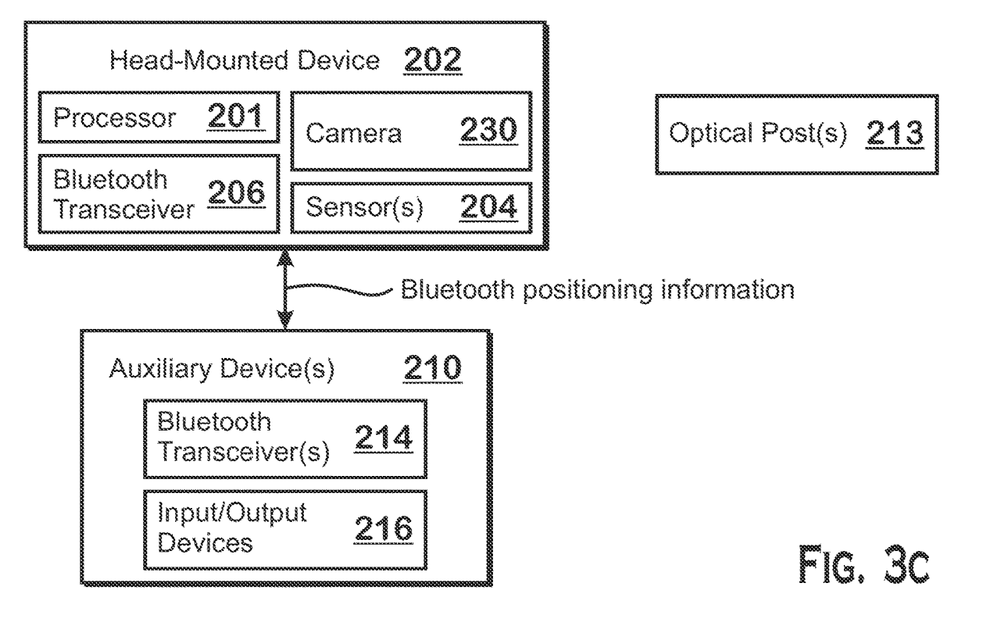
FIG. 3C illustrates a third example system that utilizes the Bluetooth transceiver of a head-mounted device to obtain position and orientation information.

FIG. 3C illustrates a third example system that utilizes the Bluetooth transceiver 206 of a head-mounted device 202 to obtain position and orientation information. The head-mounted device includes one or more sensors 204, a camera 230, a Bluetooth transceiver 206, and a processor 201. The Bluetooth transceiver 206 has the capability to detect the angle of incoming and outgoing signals from one or more Bluetooth transceivers on one or more auxiliary devices 210. The one or more auxiliary devices 210 include one or more Bluetooth transceivers 214 having the capability to transmit and receive Bluetooth signals from the Bluetooth transceiver 206 of the head-mounted device 202. The one or more auxiliary devices 210 also includes one or more input/output devices 216 which include devices for accepting inputs from a user and/or include devices for providing output to a user as described elsewhere herein.

In this example, the processor 201 utilizes the Bluetooth transceiver 206 to obtain position information relative to the one or more auxiliary devices 210. In some implementations, the processor 201 also utilizes another component, such as a camera 230 to obtain position information of the head-mounted device 202 relative to one or more optical posts 213 in the environment. Note that although a camera 230 is shown in the example of FIG. 3C as a mechanism for determining the location of the head-mounted device 202 in the environment, in some implementations, other mechanisms are used to determine the location of the head-mounted device 202 in the environment. In such examples, the head-mounted device 202 may or may not include a camera 230 and the environment may or may not include optical posts 213. The processor 201 is therefore able to determine the position of the head-mounted device 202 in the environment and to determine the position of the one or more auxiliary devices 210 relative to the position of the head-mounted devices 202.

In some examples, the camera 230 of the head-mounted device 202 operates as described with respect to FIG. 3B. Specifically, in some implementations, the when the optical posts 213 are in view of the camera, the head-mounted device 202 analyzes any or all of the position of the optical posts 213 within the frame, the size of the optical posts 213 within the frame, the relative positions and/or orientations of the optical posts 213 to each other, or uses any other visual aspect of the optical posts 213 to determine position and orientation information of the head-mounted device 202.

In some examples, determination of the position of the one or more auxiliary devices 210 is done using the information from the Bluetooth transceiver 206 on the head-mounted device and the one or more Bluetooth transceivers on the one or more auxiliary devices 210, but not based on other information. Thus the determination of the position of the head-mounted device 202 is done using a different technique than determining the position of the auxiliary device 210.

Figure 4:
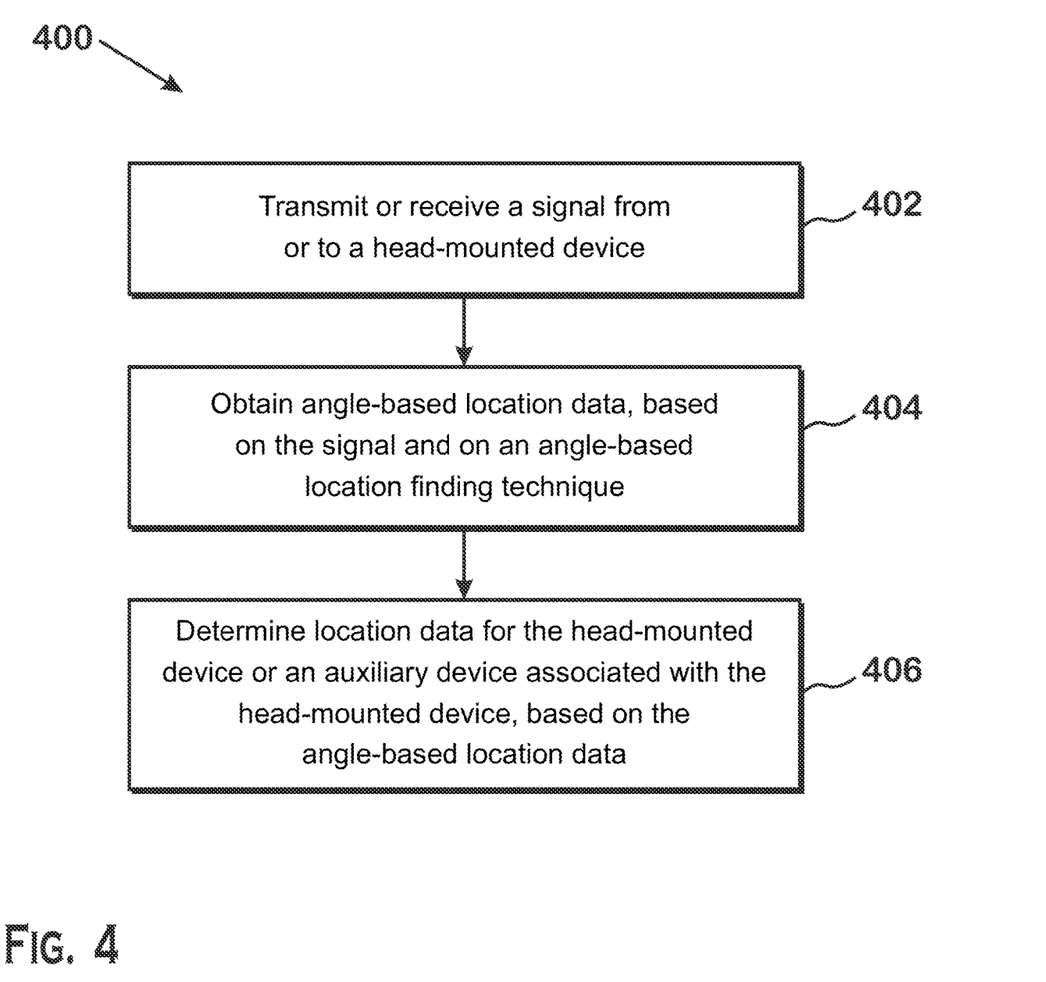
FIG. 4 is a flow diagram of a method for obtaining position data for a head-mounted device.

FIG. 4 is a flow diagram of a method 400 for obtaining position data for a head-mounted device. At step 402, a transceiver transmits or receives a signal from or to the head-mounted device. At step 404, a processor 201 obtains angle-based location data, based on the signal and on an angle-based location finding technique. At step 406, the processor 201 determines location data for the head-mounted device based or an auxiliary device associated with the head-mounted device, based on the angle-based location data.

In one example of the method 400, the processor 201 obtains location data of the head-mounted device 202 in an environment by combining location data obtained from one or more sensors that do not perform an angle-based location finding technique with the angle-based location data. In this example, the one or more sensors are used to obtain location data at a first, faster frequency, and the angle-based technique is used to correct the location data at a second, slower frequency. In an example, the sensors are one of an accelerometer or a gyroscope, and obtaining location based data from the sensors comprises integrating measurements taken from those sensors. Because such operations introduce error over time ("drift") into the measurements, the angle-based technique is used to correct for those errors by overwriting the location data with the data from the angle-based technique.

In another example of the method 400, the processor 201 obtains location data with a camera until one or more optical posts becomes obscured by an object or falls out of the field of view of the camera. At that point, the processor 201 uses the angle-based technique to determine the location of the head-mounted device 202 in the environment.

In another example of the method 400, the processor 201 uses a camera to determine location of the head-mounted device 202 in the environment and uses the angle-based technique to determine location of auxiliary devices in relation to the head-mounted device.

The various components of the head-mounted device 202 perform various control or processing tasks as described herein. In various implementations, any of these control or processing tasks are performed or coordinated by a processor 201 of the head-mounted device 202. The processor 201 may include a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

It should be understood that many variations are possible based on the disclosure herein. Although features and elements are described above in particular combinations, each feature or element can be used alone without the other features and elements or in various combinations with or without other features and elements. For example, although it is described herein that the transceivers that perform position and orientation detection are Bluetooth transceivers, a transceiver that implements any communication technology that also implements an angle of arrival and angle of departure measurement technique could be substituted for one or more of the Bluetooth transceivers.

The various functional units illustrated in the figures and/or described herein (including, but not limited to, the processor 102, the input driver 112, the input devices 108, the output driver 114, the output devices 110, or the processor 201) may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for obtaining location data for a sensor fusion device, the method comprising:
   transmitting or receiving a signal from or to the sensor fusion device;
   obtaining angle-based location data, based on the signal and on an angle-based location finding technique; and
   determining location data for the sensor fusion device or an auxiliary device associated with the sensor fusion device, based on the angle-based location data,
   wherein determining the location data based on the angle-based location data comprises obtaining sensor-based location data with one or more sensors that do not perform an angle-based location finding technique, and combining the sensor-based location data with the angle-based location data to obtain the location data for the sensor fusion device.

2. The method of claim 1, wherein:
   obtaining the sensor-based location data occurs at a first sampling frequency; and
   combining the sensor-based location data with the angle-based location data comprises updating a stored position based on the angle-based location data at a second sampling frequency that is slower than the first sampling frequency.

3. The method of claim 1, wherein:
   the sensors comprise one or more of an accelerometer and a gyroscope; and
   obtaining sensor-based location data comprises integrating one or more of acceleration or rotational motion.

4. The method of claim 1, wherein:
   the sensors comprise a camera.

5. The method of claim 4, wherein combining the sensor-based location data with the angle-based location data to obtain the location data for the sensor fusion device comprises:
   determining, as the location data, location data derived from the camera; and
   in response to detecting that one or more optical posts becomes obscured by an object in a field of view of the camera or falls out of the viewing area of the camera, determining the location data based on the angle-based location technique.

6. The method of claim 5, wherein:
   determining the location data based on the angle-based location technique does not utilize information derived from the camera.

7. The method of claim 1, wherein:
   determining the location data comprises determining location data for the sensor fusion device utilizing a camera of the sensor fusion device; and
   determining the location data comprises determining location data for the auxiliary device using the angle-based data.

8. The method of claim 7, wherein:
   determining location data for the sensor fusion device does not include deriving location data based on the angle-based location finding technique; and
   determining location data for the auxiliary device does not include deriving location data from the camera.

9. A sensor fusion system for obtaining location data for the sensor fusion system, the sensor fusion system comprising:
   a sensor fusion device; and
   a transmitter or receiver displaced from the sensor fusion device,
   wherein the sensor fusion device is configured to:
     transmit or receive a signal from or to the sensor fusion device;
     obtain angle-based location data, based on the signal and on an angle-based location finding technique; and
     determine location data for the sensor fusion device or an auxiliary device associated with the sensor fusion device, based on the angle-based location data,
     wherein determining the location data based on the angle-based location data comprises obtaining sensor-based location data with one or more sensors that do not perform an angle-based location finding technique, and combining the sensor-based location data with the angle-based location data to obtain the location data for the sensor fusion device.

10. The sensor fusion system of claim 9, wherein:
    obtaining the sensor-based location data occurs at a first sampling frequency; and
    combining the sensor-based location data with the angle-based location data comprises updating a stored position based on the angle-based location data at a second sampling frequency that is slower than the first sampling frequency.

11. The sensor fusion system of claim 9, wherein:
    the sensors comprise one or more of an accelerometer and a gyroscope; and
    obtaining sensor-based location data comprises integrating one or more of acceleration or rotational motion.

12. The sensor fusion system of claim 9, wherein:
    the sensors comprise a camera.

13. The sensor fusion system of claim 12, wherein combining the sensor-based location data with the angle-based location data to obtain the location data for the sensor fusion device comprises:
    determining, as the location data, location data derived from the camera; and in response to detecting that one or more optical posts becomes obscured by an object in a field of view of the camera or falls out of the viewing area of the camera, determining the location data based on the angle-based location technique.

14. The sensor fusion system of claim 13, wherein:
    determining the location data based on the angle-based location technique does not utilize information derived from the camera.

15. The sensor fusion system of claim 9, wherein:
    determining the location data comprises determining location data for the sensor fusion device utilizing a camera of the sensor fusion device; and
    determining the location data comprises determining location data for the auxiliary device using the angle-based data.

16. The sensor fusion system of claim 15, wherein:
  determining location data for the sensor fusion device does not include deriving location data based on the angle-based location finding technique; and
  determining location data for the auxiliary device does not include deriving location data from the camera.

17. A non-transitory computer-readable medium storing instructions that, when executed by a processor, cause the processor to obtain location data for a sensor fusion device, by:
  transmitting or receiving a signal from or to the sensor fusion device;
  obtaining angle-based location data, based on the signal and on an angle-based location finding technique; and
  determining location data for the sensor fusion device or an auxiliary device associated with the sensor fusion device, based on the angle-based location data,
  wherein determining the location data based on the angle-based location data comprises obtaining sensor-based location data with one or more sensors that do not perform an angle-based location finding technique, and combining the sensor-based location data with the angle-based location data to obtain the location data for the sensor fusion device.

18. The non-transitory computer-readable medium of claim 17, wherein:
  obtaining the sensor-based location data occurs at a first sampling frequency; and
  combining the sensor-based location data with the angle-based location data comprises updating a stored position based on the angle-based location data at a second sampling frequency that is slower than the first sampling frequency.

19. The non-transitory computer-readable medium of claim 17, wherein:
  the sensors comprise one or more of an accelerometer and a gyroscope; and
  obtaining sensor-based location data comprises integrating one or more of acceleration or rotational motion.

20. The non-transitory computer-readable medium of claim 17, wherein:
  the sensors comprise a camera.

* * * * *